March 20, 1951 — F. H. McINTOSH — 2,545,788

MODULATOR SYSTEM

Filed Dec. 22, 1948 — 2 Sheets-Sheet 1

INVENTOR.

FRANK H. McINTOSH

BY [signature]

HIS ATTORNEY

INVENTOR.
FRANK H. McINTOSH
BY Hyman Hurvitz
HIS ATTORNEY

Patented Mar. 20, 1951

2,545,788

UNITED STATES PATENT OFFICE 2,545,788

MODULATOR SYSTEM

Frank H. McIntosh, Chevy Chase, Md.

Application December 22, 1948, Serial No. 66,743

28 Claims. (Cl. 332—43)

The present invention relates generally to improved modulators for radio frequency carriers, and more particularly to improved methods and apparatus for modulating the amplitude of radio frequency signals; to a simplified and more economical wide band class AB and class B plate modulation system; and to improved class AB and class B electronic amplifiers, capable of utilization as such, or as modulators, and which introduce negligible distortion over an extremely wide band of frequencies.

The present invention is a continuation in part of my application for U. S. Patent filed concurrently herewith, and entitled "Wide Band Amplifier Coupling Circuits," Serial #66,741, now Patent #2,477,074, issued July 26, 1949.

The class B amplifier is a push-pull amplifier in which the tubes are biased approximately to cut-off. One of the tubes, in the normal system, amplifies the positive half cycles of the signal voltage, while the other amplifies the negative half cycles, the output transformer combining the outputs of the two tubes to reconstruct a replica of the signal voltage. Amplifiers of this type find wide application both as amplifiers of signals and of bands of signals, and as modulators, particularly for accomplishing class B modulation of the final class C stage of a radio transmitter, or of an oscillator.

The plate modulated class C amplifier is an ordinary class C amplifier in which the modulating voltage is superimposed upon the D.-C. plate supply voltage. This makes the total effective plate voltage consist of the sum of the D.-C. plate supply voltage and of the modulating voltage, and so correspond to the desired modulation envelope. The class C amplifier has an exciting voltage, grid bias, and tank circuit so proportioned that with the plate voltage equal to twice the D.-C. plate supply voltage, the tube operates as a conventional class C amplifier with good plate efficiency and with a power output corresponding to four times the carrier power to be developed. If the effective plate voltage is then varied between zero and twice the D.-C. plate supply voltage by the modulating voltage, the radio frequency output voltage will closely follow the plate voltage variations.

The power amplifier which develops the voltage that is superimposed upon the plate supply potential of the class C amplifier in order to modulate its output is termed a modulator. It is usually a class B or a class AB amplifier. The modulator delivers its output to a load having an impedance equal to the ratio of the D.-C. plate voltage to the D.-C. plate current of the class C tube. For complete or 100% modulation, the modulating power required is 50% of the D.-C. plate power that must be supplied by the tube in its unmodulated condition. The modulator is accordingly called upon to deliver to the modulated amplifier sufficient energy to generate the side band power with class B amplifier efficiency. Complete modulation requires that the peak value of the modulating voltage equal the D.-C. plate voltage. This requires not only that the modulator have sufficient power capacity but also that there be a proper impedance match. In particular, in the usual case where both modulator and modulated tubes receive their plate voltage from a common supply, it is necessary to provide either an impedance matching transformer or auto transformer, or to reduce the plate voltage of the modulated tube by means of a resistance by-passed to modulation frequencies.

The frequency limits of conventional power amplifiers or modulators depend largely upon the design of the output transformer, loss of amplification at low frequencies resulting from the low incremental inductance of the transformer primary at low frequencies, and falling off at high frequencies resulting from leakage inductance and the various distributed capacities of the transformer. In order to obtain a good low frequency response the incremental primary inductance of the transformer must be high relative to the plate resistances of the tubes used. The primary winding of the transformer then should have a large number of turns. At the same time the resonant frequency of the transformer leakage inductance and secondary capacitance must be beyond the highest frequency desired to be amplified, so that low leakage inductance and shunt capacity is essential, if the frequency response of the transformer is to be extended.

The above requirements are mutually conflicting, in various respects. The size of the core of the transformer, that is, the total iron utilized, is limited by consideration of cost, space, and weight requirements. This, in turn, fixes the total number of turns allotted to the primary and secondary windings. Decreasing core size and increasing total turns in the primary winding to attain winding incremental inductance increases leakage inductance and shunt capacity, which in turn, reduces resonant frequency, and hence the high frequency response of the transformer. In practice, leakage inductance is decreased by inter-leaving primary and secondary windings, but this increases distributed capacity and so tends to neutralize the benefits obtained.

The effects of leakage inductance in class B and class AB push-pull amplifiers have been considered in the literature, and attention is directed particularly to an article by A. Pen-Tung Sah, in proceedings of the I. R. E. for November 1936. Sah points out particularly the deleterious effect of leakage inductance between primary windings on the output transformer of such an amplifier, first, in causing a decreased output, as frequency increases, and second, in introducing a time constant into the circuit, thus causing transients which distort the output wave as one of the tubes changes from a conducting condition to a blocking condition, and vice-versa. The latter effect is the basis of great distortion at the higher audio frequencies.

It is an object of the present invention to provide improved push-pull amplifiers having negligible leakage reactance in their output transformers, and hence negligible transient effects during change over of each tube of the amplifier from conducting to non-conducting condition.

It is a further object of the invention to provide a push-pull wide band amplifier of relatively simple and economical construction having no leakage inductance between primary windings of the output transformer thereof.

It is another object of the invention to provide an improved push-pull amplifier employing an output transformer having bi-filarly related primary windings, or equivalent windings.

It is a further object of the present invention to provide a push-pull amplifier utilizing an output transformer having bi-filar primary windings, the amplifier employing pentode or tetrode electronic tubes, or beam power tubes, wherein is provided means for maintaining the screen grid of each of the tubes at a fixed potential with respect to the associated cathode during operation of the tubes in the amplifier.

It is still another object of the invention to provide a push-pull amplifier arrangement capable of effectively utilizing a transformer having substantially zero leakage inductance between its primary windings, and which requires but a single anode voltage source for all the tubes in the amplifier.

It is a further object of the present invention to provide a novel arrangement for modulating the output of a class C amplifier.

It is another object of the invention to provide a novel system for directly modulating the output of a class C amplifier by means of a push-pull amplifier utilizing the power supply of the push-pull amplifier as the plate voltage supply for the class B amplifier.

The above and still further objects and advantages of the invention will become apparent upon consideration of the following detailed description of various specific embodiments thereof especially when taken in conjunction with the accompanying drawings wherein.

Figure 1:
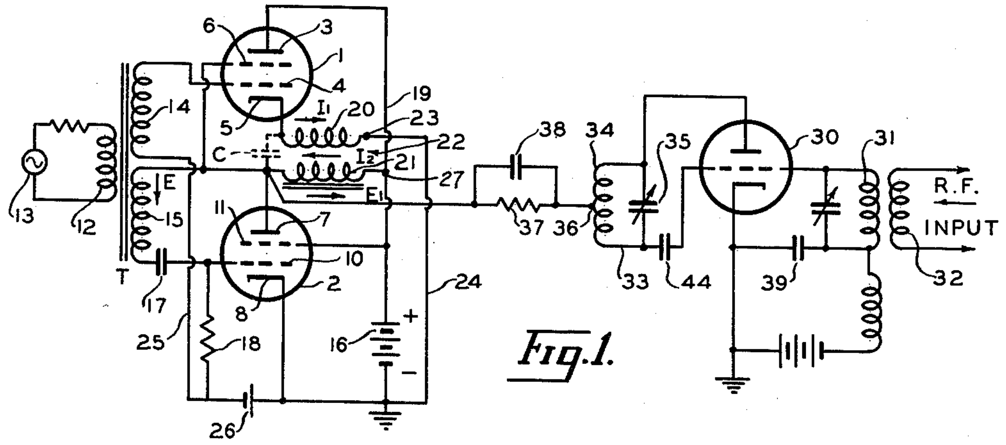
Figure 1 illustrates a schematic circuit diagram, a modulation system arranged in accordance with the present invention wherein a class B amplifier having an output transformer with bi-filarly related primary windings is utilized to modulate the output of a class C amplifier.
Figure 5:
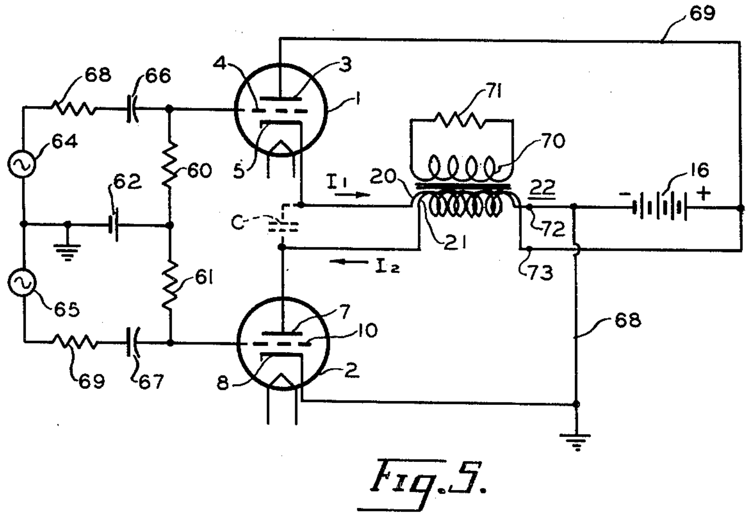
Figure 5 is a schematic circuit diagram of a class B modulator capable of utilization in any of the systems of Figures 1 to 4 inclusive, in place of the modulators there shown.

Reference is now made particularly to Figure 1 of the drawings wherein is disclosed a modulation circuit comprising a class B or class AB modulated class C amplifier, the class B modulator corresponding with the modulator illustrated in Figure 5 of the drawings of my prior application above referred to, and the circuit connection and mode of operation of which is described in detail in the above mentioned application for U. S. patent.

Referring now more specifically to Figure 1 of the drawings, the reference numeral 1 denotes one electronic amplifier tube comprised in a class B or class AB modulator, the electronic tube 2 comprising the other of the pair. The electronic tube 1 may comprise an anode 3, a control electrode 4 and a cathode 5 and may, if desired, be a triode tube. However, in the alternative, the electronic tube 1 may be a tetrode, a pentode or a beam power tube, in which case, there must be provided at least a screen grid electrode 6.

The electronic tube 2 is a duplicate of the electronic tube 1, the anode being identified by the reference numeral 7, the cathode by the reference numeral 8, the control electrode by the reference numeral 10 and the screen by the reference numeral 11.

Input audio or video signal, or any other signal which it is desired to transmit, may be applied to the primary winding 12 of an input audio transformer T from a suitable source conventionally illustrated at 13. Current flowing in the primary winding 12 of the input transformer T induces voltages in opposite phase on the secondary windings 14 and 15 of the input transformer T. The secondary winding 14 is connected between the control electrode 4 of the vacuum tube 1 and the negative terminal of a source of plate potential 16 which is common to the electronic tubes 1 and 2. The secondary winding 15, on the other hand, is connected between the anode 7 and the control electrode 10 of the vacuum tube 2, a suitable blocking condenser 17 being inserted in series with the control electrode 10 of the electronic tube 2, and the control electrode 10 being shunted to ground via a grid leak 18.

The anode 3 of the electronic tube 1 is connected directly via a lead 19 to the positive terminal of the voltage source 16, and the tube 1 is cathode loaded by means of a primary winding 20 which is bi-filarly related to a similar primary winding 21 of an output transformer 22, the primary winding 20 being connected directly between the cathode 5 of the electronic tube 1 and the negative terminal of the voltage source 16.

The primary winding 21 is connected in the plate circuit of the electron tube 2, being connected directly between the plate or anode 7 thereof and the positive terminal of the voltage source 16. If screen grids are utilized, screen grid 6 may be connected directly to the anode 7 of the electron tube 2, while screen grid 11 of the electron tube 2 may be connected directly to the positive terminal of the voltage source 16.

Accordingly, the input circuit of the tube 1 sees two alternating voltages, one originating in the primary winding 12, and which is inductively transferred to the input circuit via the secondary winding 14 of the input transformer T, and the second constituting a degenerative feed-back voltage deriving from the primary winding 20 of the output transformer 22 by virtue of the connection of the terminal 23 of the primary winding 20 to the control electrode 4 of the electronic tube 1 via the leads 24 and 25. Voltage source 26 in series with the leads 24 and 25 operates, then, as a bias source for the control electrode 4 of the electron tube 1.

Considering now the electron tube 2, the input circuit of the tube sees two alternating voltages, one originating in the secondary winding 15 of the input transformer T and the second constituting a degenerative voltage deriving from the primary winding 21 of the output transformer 22, which is degenerative by virtue of the fact that winding 21 is effectively in the cathode circuit of tube 2, varying the potential of the cathode 8 with respect to the anode 7 in one phase while the potential of control electrode 10 is being varied in the same phase with respect to anode 7 by the voltage in secondary winding 15 of input transformer T.

Looked at in another way, the input voltage for the tube 2 consists of the voltages of windings 15 and 21 in series. So, when the positive half cycle of voltage across winding 15 is in the direction of the arrow E, the potential of the control electrode 10 with respect to cathode 8, assuming the latter fixed, increases positively. This results in an increase of plate current, which increases the voltage across coil 21, resulting in a voltage across winding 21 in the direction of arrow E'. It will be obvious that, as seen from the grid-cathode circuit of the tube 2, voltages E and E' are oppositely directed, and hence that voltage E' is degenerative.

Additionally, if a screen grid 6 is provided in tube 1, this may be connected directly to the anode 7 of tube 2, and will be maintained at a potential with respect to cathode 5 of tube 1 equal to the voltage of the source 16, because the same A.-C. voltages exist at all times on anode 7 and on cathode 5, since the output transformer 22 has bi-filarly wound primary windings, adjacent ends of which remain relatively at identical potential despite the flow of current in either one or both of the primary windings.

Similarly a screen grid 11 provided in tube 2 may be connected directly to the positive terminal of the source 16 and will be maintained at an A.-C. voltage difference from the potential of cathode 8 equal to the voltage of source 16, since no impedance exists between the screen grid 11 and the cathode 8.

While the anode 7 of the tube 2 and the cathode 5 of the tube 1 may be maintained at identical zero difference of A.-C. potential during operation of the amplifier by reason of the fact that the primary windings 20 and 21 are bi-filarly wound, it is realized that modifications of the present invention may be contemplated wherein primary windings 20 and 21, instead of being truly bi-filarly wound, may be wound in a fashion which is electrically equivalent to bi-filar windings in many respects although not in all respects. In such case, some A.-C. voltage may be constrained to exist between mutually adjacent points of the windings 20 and 21 unless a capacitor is connected between the anode 7 and the cathode 5, or across the terminal of the windings 20 and 21 which are connected respectively to the cathode 5 and the anode 7. Accordingly, I have shown in dotted outline a coupling condenser C connected between the cathode 5 and the anode 7, which, if properly selected in respect to size, will materially assist in maintaining A.-C. voltage correspondence between the cathode 5 and the anode 7 should the transformers 20 and 21, per se, fail completely to accomplish this objective.

If it be assumed now that the modulator is operating class B and that a sine wave potential is applied to the control electrodes 4 and 10 of triodes 1 and 2 from the source 13, and via the input transformer T, the positive half of the sine wave deriving from the input transformer T may be assumed to effect current transfer through the triode 1, and the negative half sine wave deriving from the source 13 may be assumed to drive the control electrode 11 positive with respect to the associated cathode 8 and accordingly to effect current transfer through the tube 2. It will be apparent that while the control electrode 4 is positive with respect to its cathode 5, and the tube 1 is conducting current, that tube 2 will be off, and that in the alternative while the tube 2 is conducting current, that the tube 1 will be cut off, if the system is biased for class B operation and is operating properly. Currents in the primary windings 20 and 21 of the output transformer 22, accordingly, flow respectively in opposite directions, the current in the winding 20 being represented by the arrow $I_1$ and the current in the primary winding 21 being represented by the arrow I. Accordingly, with respect to the flux produced in the magnetic core of the output transformer 22 current flow in the windings 20 and 21 is in opposite direction, so that an alternating magnetic flux is set up in the core, and so that an alternating voltage is induced across each of the primary windings 20 and 21.

In some applications, whether used as a class B amplifier or as a modulator, a secondary winding may be associated with the core or with the windings 20 and 21, and output signal derived therefrom in a manner which has been illustrated and explained in the above identified prior application.

By virtue of the close coupling existing between the primary windings 20 and 21, the close coupling being brought about by the manner of winding the primary windings 20 and 21, substantially no leakage inductance will exist between these primary windings, and, accordingly, as explained in the article by Sah, cited hereinbefore, no transient effect will exist during change over of current carrying function from the tube 1 to the tube 2 and vice versa. At the same time, the direction of the voltages existing across both the windings 20 and 21 are always in identical direction, despite the fact that current flow in the two windings is in opposite sense, because of the fact that the time/phase of the current cycles is opposite and the windings are unity coupled.

If we assume that the tube 2 is cut off, and the tube 1 is conducting, for example, the winding 20 induces in the winding 21 a voltage equal to its own voltage, and in the same phase in the two windings, the voltage in winding 21, however, being incapable of causing current flow in tube 2 because the input voltage applied to control electrode 9 of tube 2 is now negative in phase, and of sufficient amplitude with respect to the voltage applied to the anode of tube 2 by winding 21 to prevent such current flow. Precisely the same argument may be presented when tube 2 is conducting and tube 1 is cut off.

Furthermore, the terminals 23 and 27 of the primary windings 20 and 21 are directly connected via the potential source 16, which may be assumed to have zero impedance, and the total number of turns contained in the winding 20 and 21 are precisely equal. Accordingly, no A.-C. potential difference exists between any two adjacent points of the windings 20 and 21, so that but slight or zero capacitive currents flow between adjacent turns of the primary windings 20 and 21. Such currents as do flow tend to maintain the potentials of adjacent points of the two primary windings 20 and 21 identical, and accordingly, contribute to the proper functioning of the system. The condenser C may, if desired, be connected directly from cathode 5 to anode 7, as explained hereinbefore, without altering the operation of the system essentially, and if used assists in establishing the equi-potential relation between adjacent turns, particularly at the higher frequencies, where some leakage reactance might conceivably be present due to imperfections of the winding spacings.

The amplifier arrangement containing tubes 1 and 2 may obviously be used as a modulator in accordance with conventional systems, and particularly for plate circuit modulation of a class C amplifier or oscillator. However, when employed for this purpose the specific circuit of Figure 1 of the drawings has virtues not normally present in the usual type of class B or class AB modulator, in that the anode 7 may be connected to the anode of a class C amplifier or oscillator, whereupon the source of anode voltage 16 becomes available as a voltage source for the class C amplifier, and the variations of voltage existing across the winding 21 utilized to add to or substract from the potential otherwise available across the source 16, thereby to provide a varying plate voltage for the class C amplifier or oscillator, and, accordingly, to modulate the output of the latter in amplitude.

Referring more particularly to Figure 1 of the drawings, there is illustrated a class C amplifier of conventional character comprising a vacuum tube 30 having a tuned input circuit 31 supplied from a source of radio frequency signal 32, and having a tuned output circuit 33 comprising a coil 34 and a condenser, the coil 34 being tapped at some convenient point 36 for purposes of connection with the anode 7 of the tube 2 via a voltage dropping resistance 37 which is by-passed for audio frequency by condenser 38.

It will be noted that the system of Figure 1 partakes of the nature of Heising modulation, in that the class C amplifier is in series with an audio frequency winding and with a plate supply voltage. However, the system possesses many advantages over conventional Heising modulation in that the driving circuit may be operated class B or class AB, and hence at extremely high efficiencies and power output.

Figure 2:
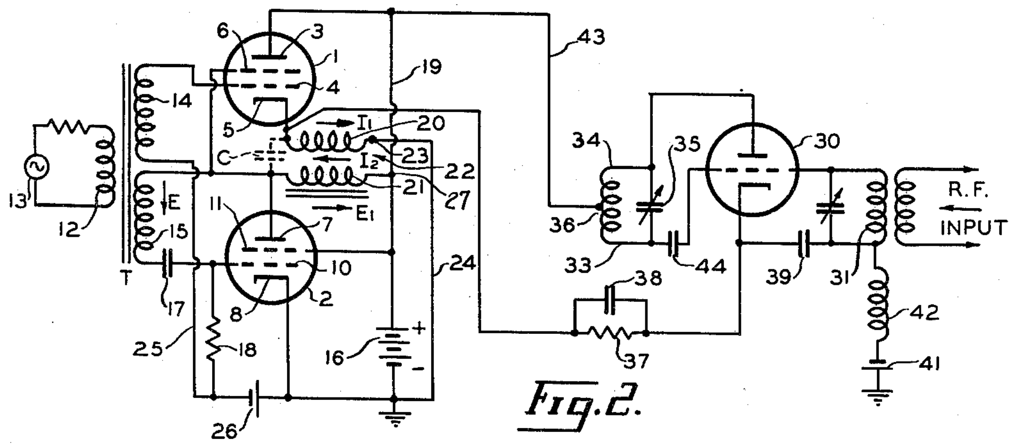
Figures 2, 3 and 4 are schematic circuit diagrams of modifications of the system of Figure 1.

It will be realized, since identical variations of voltage appear across the coils 20 and 21, that modulating signal may be provided for the class C amplifier of the present system from the circuit of the tube 1, instead of from the circuit of the tube 2. A system of this character is illustrated in Figure 2 of the drawings wherein the dropping resistance 37 and the by-pass condenser 38 are connected in the cathode lead of the triode 30, comprised in a class C amplifier, the cathode of triode 30 being then ungrounded. The cathode of the triode 30 may be connected via the dropping resistor 37 and the by-pass condenser 38 to the cathode 5 of the tube 1. The tank circuit 33 of the tube 30 of the class C amplifier, in the system of Figure 2, may be connected between anode and control electrode of the tube 30, the tuned input circuit 31 of the tube 30 being connected between the control electrode and the cathode of the tube 30 via a blocking condenser 39 connected in the cathode lead, the blocking condenser 39 serving as an R. F. by-pass condenser, and serving effectively to block audio frequencies as well as D.-C. The grid of the tube 30 may then be returned to ground over a bias source 41 and via a radio frequency choke 42.

The voltage supply circuit for the tube 30 in the system of Figure 2 of the drawings, extends then directly from the positive terminal of the source 16 via lead 43 to the anode of the tube 30, through the tube 30 to its cathode, and hence via dropping resistor 37 to the cathode of tube 1, and back to the negative terminal of the supply source 16 via the primary winding 20. The primary winding 20 is then in the cathode circuit of the class C amplifier tube 30, rather than in the anode circuit, and the cathode potential of the tube 30 varies with respect to ground at the modulation rate, while the D.-C. anode potential remains constant.

The winding 20 of the transformer 22, which supplies modulation signal to the class C tube 30, is not shunted to ground by the condenser 39, the radio frequency choke 42, and the bias source 41, since the total impedance of the blocking condenser 39 to the range of frequencies involved is extremely high. The control electrode of the tube 30 is isolated with respect to anode voltage supplied by the source 16 by means of a blocking condenser 44, which serves to couple the tuned anode and grid circuits of the class C amplifier tube 30, for neutralization, and for D.-C. blocking of the potential of voltage source 16.

The class B or class AB modulator, comprising the tubes 1 and 2, may, in the system of Figure 2, be arranged identically with the arrangement shown in Figure 1 of the drawings, and accordingly requires no further elucidation at this point in the specification.

It will be realized, upon consideration of the circuit illustrated in Figures 1 and 2 of the drawings, that D.-C. current supplied to the class C amplifier tube 30 flows, in each case, through one of the windings 20, 21 of the output transformer 22, so that D.-C. flux exists in the core of the transformer. The transformer, accordingly, cannot be designed identically if used as a class B modulator in accordance with the arrangements illustrated in Figures 1 and 2 of the drawings, as would be the case were the class B or class AB amplifier comprising the tubes 1 and 2 utilized in a more conventional circuit. On the contrary, the core, and the transformer as a whole, must be designed to take account of the D.-C. flux encountered. This involves utilization of a more expensive transformer than would otherwise be the case, since the transformer must be supplied with a suitable air gap to effect operation on the proper point of its magnetization curve. Since employment of an air gap increases the reluctance of the magnetic circuit a core must be provided which either has a greater cross section, or smaller total length, or both, or in the alternative more turns on the transformer.

The system of the present invention may be practiced, however, with an output transformer for the tubes 1 and 2 which is balanced with respect to D.-C. current, and accordingly, with respect to D.-C. magnetic flux, by a modification of the systems of Figures 1 and 2, the modification being suitable for employment in conjunction with either the system of Figure 1 or of Figure 2.

Figure 3:
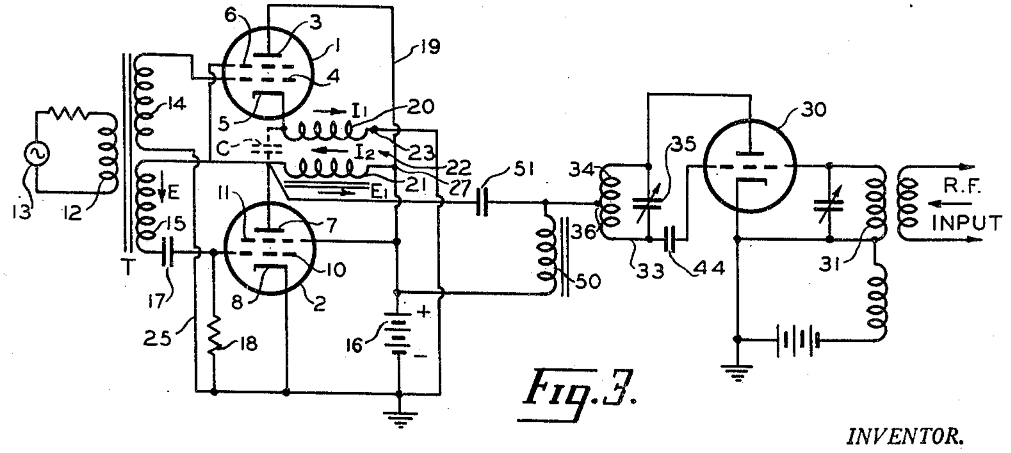
Figure 4:
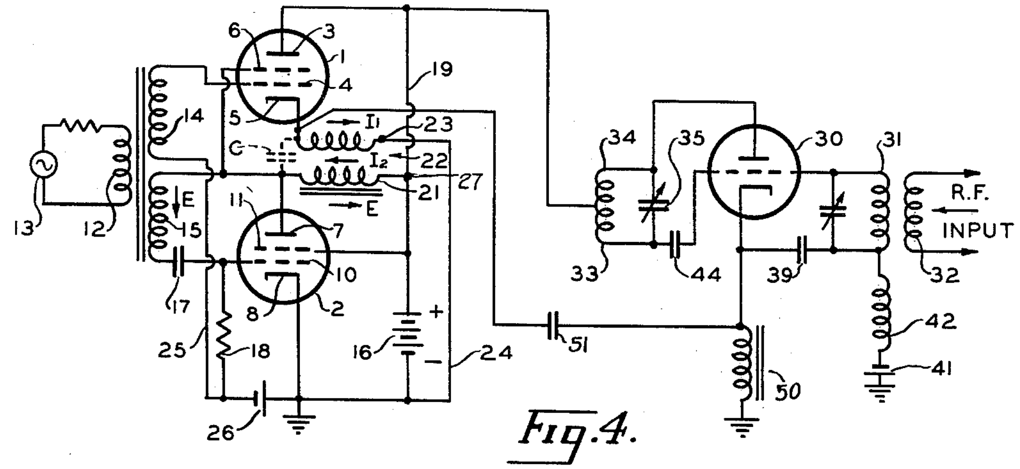

Reference is now made particularly to Figures 3 and 4 of the drawings, wherein is illustrated modifications of the system illustrated in schematic circuit diagram in Figures 1 and 2 of the drawings, the modifications providing a system wherein the core of the output transformers of the class B or class AB amplifiers of the system operate without D.-C. flux. The system of Figure 3 of the drawings corresponds to the system of Figure 1 of the drawings except that the voltage dropping resistance 37 and the bypassing condenser 38 are omitted. The class B or AB modulator is identical in arrangement and mode of operation as in the system of Figure 1. The anode lead connected to the tap 36 is connected, however, to one end of a choke coil 50, the remaining end of which is connected to the positive terminal of the voltage source 16. The first mentioned end of the choke coil 50 is then coupled by means of a coupling condenser 51 directly to the anode 7 of the tube 2. The choke 50, accordingly, is in series with the source of voltage 16, and with the anode of the class C amplifier tube 30, and carries a D.-C. current corresponding to the plate current of the tube 30. Choke 50 is, however, isolated for D.-C. voltage and current from the winding 21 of the output transformer 22 by reason of the blocking condenser 51, which is interposed so that no portion of the D.-C. plate current of the tube 30 flows in either of the windings 20 or 21 of the output transformer 22, the latter then operating with zero D.-C. flux. At the same time, the voltage developed across the winding 21 appears across the choke 50, the condenser 51 operating as a coupling condenser for this signal, and, the choke 50 being in series with the source of anode voltage 16 for the tube 30, the total anode voltage of the tube 30 varies in magnitude in accordance with the signal or modulating voltage, resulting in modulation of the carrier frequency signals impressed into the class C amplifier via the input circuit 32.

The system of Figure 4 of the drawings represents a modification of the system of Figure 2, wherein the cathode circuit of the tube 30 is isolated from the output transformer 22 or any of its windings 20, 21 by a blocking condenser 51, the plate current of the tube 30 flowing from the cathode of the tube 30 through the choke 50 to ground, or to the negative terminal of the voltage source 16. Accordingly, again, the D.-C. plate current of the tube 30 does not flow through any of the windings 20, 21 of the class B modulator, but flows solely through the choke 50. At the same time the voltage variations existing across the winding 20 are impressed across the choke 50 by the coupling condenser 51, and, the choke 50 being in series between the source of potential 16 and the cathode of the tube 30, the total voltage across the tube 30 varies in accordance with the signal appearing across the choke 50, and the output of the tube 30 is amplitude modulated in accordance with the envelope of the signal.

Reference is now made to the modulator or amplifier circuit illustrated schematically in Figure 5 of the drawings, the latter representing a modification of the modulators illustrated in Figures 1 to 4, inclusive, of the drawings and described in detail hereinabove. The modulator illustrated in Figure 5 of the drawings may be operated class AB or class B and may be utilized to modulate the output of a class C amplifier, or of an oscillator, or the like, in accordance with principles well known in the prior art.

Referring now more specifically to Figure 5 of the drawings, the amplifier or modulator is illustrated as employing a pair of triodes 1, 2 as amplifying electronic devices, the triodes 1, 2 being provided respectively with grid leaks 60 and 61, which are connected between the control electrodes 4 and 10 of the triodes 1 and 2, respectively, the mid point of the grid leaks 60, 61 being grounded via a bias source 62. The driving potential is applied to the control electrodes 4 and 10 from two sources conventionally illustrated as generators 64 and 65, which may be presumed to provide potentials of opposite phase with respect to ground, and of suitable relative magnitude. The potentials provided by the sources 64 and 65 are applied to the control electrodes 4 and 10 of the triodes 1 and 2 via coupling condensers 66 and 67 respectively, resistors 68 and 69 representing the internal impedances of the generators 64 and 65, respectively. The bias established by the bias source 62 may be such as to cause operation of the triodes 1 and 2 either as class A, as class AB or class B amplifiers, the significance of the classification being well understood in the art. While the circuits and structures of the present application have wide utility in amplifiers operating in accordance with any one of the above-mentioned classifications, the circuit has primary application to class B modulators, and will be described accordingly as utilized in modulators of this class, without intending thereby to limit the scope of the invention. Accordingly, the bias source 62 will be established to have a value such as to cut off the plate current of the triodes 1 and 2 in the absence of signal voltage applied to the control electrodes 4 and 10 thereof.

A source of anode voltage 16 is provided, conventionally illustrated as a battery to simplify the drawings. The negative terminal of source 16 is grounded via the lead 68, and the positive terminal of source 16 is connected via the lead 69 to the anode 3 of the triode 1, the primary winding 20 of output transformer 22 being connected in the cathode lead of the triode 1, intermediate the cathode 5 thereof and the negative terminal of the voltage source 16. The cathode 8 of the triode 2 is connected directly to ground, and a further primary winding, 21 of the output transformer 22 is connected between the positive terminal of the potential voltage source 16 and the anode 7 of the triode 2.

The primary windings 20 and 21 are wound in relatively bi-filar manner, or equivalently, as indicated in the schematic circuit diagram, the wires forming one of the windings being immediately adjacent the wires forming the other of the windings, so that substantially zero leakage inductance exists between the windings 18 and 21. If it be assumed that a sine wave of potential is applied to the control electrodes 4 and 10, respectively, by the sources 64 and 65, the positive half of the sine wave deriving from the source 64 effecting current transferred through the triode 1 and the positive half of the sine wave deriving from the source 65 effecting current transfer through the triode 2, it will be apparent that while the positive half of the first mentioned sine wave is applied to the control electrode 4 that the triode 2 is cut off and that current flow through the primary winding 20 takes place in the direction of the arrow $I_1$. On the other hand, while the positive half of the second mentioned sine wave is applied to the control electrode 10 the triode 2, the triode 1 is cut off and current flows through the primary winding 21 accordingly takes place in the direction of the arrow $I_2$. Accordingly, with respect to magnetic flux produced in the core of the transformer 22, current flow in the windings 20 and 21 is in opposite directions, so that an alternating magnetic flux is set up in the core and an alternating voltage induced in the secondary winding 70 of the transformer 22, for application to a load circuit conventionally illustrated as a resistance 71, and which in practical operation of the present system may be constituted of a class C amplifier, an oscillator, or some other device which supplies radio frequency current to be modulated.

By virtue of the close coupling existing between the primary windings 20 and 21 of the transformer 22, the close coupling being brought about by the manner of winding the primary windings 20 and 21, substantially no leakage reactance will exist between these primary windings. Accordingly, as explained in the article by Sah, above cited, no transient effects will exist during change over of current carrying functions from the triode 1 to the triode 2 and vice versa. At the same time, the direction of the voltage existing across both the windings 20 and 21 are always identical, despite the fact that current flow in the two windings is in opposite sense, because of the fact that the windings conduct in alternation, and are closely coupled.

If we assume that the triode 2 is cut off, and that triode 1 is conducting, for example, the winding 20 induces in the winding 21 a voltage congruent with its own voltage and in the same sense in the two windings, the voltage in winding 21, however, being incapable of causing current flow in triode 2 because the input voltage applied to the grid 10 is now negative in phase and of sufficient amplitude with respect to the voltage supplied to the anode 7 of triode 2 by winding 21, to prevent such current flow. Precisely the same argument may be presented when triode 2 is conducting, and triode 1 cut off. The terminals 72 and 73 of the primary windings 20 and 21 are directly connected together via the potential source 16, which may be assumed to have zero impedance, and the total number of turns contained in the windings 20 and 21 are precisely equal. Accordingly, no A.-C. potential difference exists between any two adjacent points of the windings 20 and 21, so that but slight or zero capacitive currents flow between adjacent turns of the primary windings 20 and 21. Such currents as do flow tend to maintain the potentials of adjacent points of the two primary windings 20 and 21 identical, and accordingly contribute to the proper functioning of the system.

A condenser C may, if desired, be connected directly from cathode 5 to anode 7 without altering the operation of the system essentially, but to assure the A.-C. equi-potential relation between adjacent turns, particularly at the higher frequencies, where some leakage reactance might conceivably be present due to imperfection in the winding spacing.

It will be noted, upon close analysis, that, the triode 1 being cathode loaded and the triode 2 anoded loaded, the former is subject to degeneration and the latter is not so subject. The gain of the triodes 1 and 2 are not equal, for that reason, and the input signals must be compensated accordingly.

It will be realized that the amplifier or modulator illustrated in Figure 5 of the drawings is, in respect to its output circuit, substantially identical with the output circuit of the modulators or amplifiers illustrated in Figures 1 to 4 of the drawings. Accordingly, the amplifier or modulator of Figure 5 of the drawings may be employed in each of the modulation systems illustrated in Figures 1 to 4 of the drawings in place of the modulators there illustrated.

While I have described various modifications of my improved modulation system and of my improved modulators, it will be realized that still further variations, both in respect to details and in respect to general arrangement, may be resorted to without departing from the true spirit of the invention as defined in the appended claims.

What I claim and desire to secure by Letters Patent of the United States is:

1. A modulation system, comprising, a push-pull modulator having an output circuit, said output circuit comprising a pair of unity coupled windings, a source of radio frequency oscillations to be modulated comprising an electronic tube having an electrode responsive to control potential for determining the amplitude of said oscillations, and means for transferring control potential from a single point of said unity coupled windings to said electrode.

2. A modulation system, comprising, a pair of push-pull modulator tubes having each an anode and a cathode, an output circuit for said modulator tubes comprising a first winding connected in the cathode circuit of one of said tubes, a second winding connected in the anode circuit of the other of said tubes, said windings being unity coupled, a single source of anode voltage for said tubes, a source of radio frequency oscillations comprising a vacuum tube, said vacuum tube comprising means responsive to voltage variations for modulating the amplitude of said oscillations, means for deriving operating voltage for said vacuum tube from said single source of anode voltage, and means for deriving said voltage variations from said first and second windings.

3. A modulation system, comprising a pair of push-pull modulator tubes having each an anode and a cathode, an output circuit for said modulator tubes comprising a first winding connected in the cathode circuit of one of said tubes, a second winding connected in the plate circuit of the other of said tubes, said windings being bifilarly related, a single source of anode voltage for said tubes, a source of radio frequency oscillations comprising a vacuum tube, said vacuum tube comprising means responsive to voltage variations for modulating the amplitude of said oscillations, means for deriving operating voltage for said vacuum tube from said single source of anode voltage, and means for deriving said voltage variations from said first and second windings.

4. A modulation system, comprising a first modulator tube having an anode, a cathode and a control grid, a second modulator tube having a second anode, cathode and control electrode, a single source of anode voltage for said modulator tubes, said source of voltage having a positive terminal and a negative terminal, means connecting said positive terminal to said first anode, first output winding, means connecting said first output winding between said first cathode and said negative terminal, a second output winding bi-filarly related to said first output winding, means connecting said second winding in series between said positive terminal and said second anode, means connecting said second cathode to said negative terminal, means for driving said electron tubes in push-pull relation, a third vacuum tube circuit for generating radio frequency oscillations, said third vacuum tube circuit comprising an electronic tube having an anode and means for connecting said second anode to said anode of said third electronic tube.

5. A modulation system comprising a pair of push-pull modulator tubes each having an anode and a cathode, an output circuit for said modulator tubes comprising a first winding connected in the cathode circuit of one of said tubes, a second winding connected in the anode circuit of the other of said tubes, said windings being unity coupled, a single source of anode voltage for said tubes, a source of radio frequency oscillations comprising a vacuum tube, said vacuum tube comprising means responsive to voltage variations for modulating the amplitude of said oscillations, a coil coupled across one of said windings, and a D.-C. connection from one end of said coil to the anode of said vacuum tube.

6. A modulation system, comprising, a push-pull modulator having an output circuit, said output circuit comprising a pair of unity coupled windings, a source of radio frequency oscillations to be modulated comprising an electronic tube having an electrode responsive to control potential for determining the amplitude of said oscillations, and a D.-C. connection from one of said windings to said electrode of said electronic tube.

7. A modulation system, comprising, a first vacuum tube having an anode, a cathode and a control electrode, a second vacuum tube having an anode, a cathode and a control electrode, a single source of anode voltage having a positive terminal and a negative terminal, means connecting said positive terminal to said first anode, means connecting said negative terminal to said second cathode, a first output winding connected between said first cathode and said second cathode, a second output winding connected between said first anode and said second anode, said output windings being unity coupled, a class C amplifier comprising an electronic tube having an anode, and a D.-C. connection between said last named anode and said second anode.

8. A modulator, comprising, a first electronic tube having a first anode, cathode and control electrode, a second electronic tube having a second anode, cathode and control electrode, a source of anode voltage having a positive terminal and a negative terminal, a first winding connected between said cathode and said negative terminal, a second winding connected between said second anode and said positive terminal, said windings being unity coupled, means for rendering said electronic tubes conductive in alternation, a D.-C. non-inductive connection between said first anode and said positive terminal, and a D.-C. non-inductive connection between said second cathode and said negative terminal.

9. A modulator, comprising, a first electronic tube having a first anode, cathode and control electrode, a second electronic tube having a second anode, cathode and control electrode, a source of anode voltage having a positive terminal and a negative terminal, a first winding connected between said cathode and said negative terminal, a second winding conected between said second anode and said positive terminal, said windings being relatively bi-filarly wound, means for rendering said electronic tubes conductive in alternation, a D.-C. non-inductive connection between said first anode and said positive terminal, and a D.-C. non-inductive connection between said second cathode and said negative terminal.

10. A modulator, comprising, a first electronic tube, having a first anode, cathode and control electrode, a second electronic tube having a second anode, cathode and control electrode, a source of anode voltage having a positive and a negative terminal, a first output winding connected between said first cathode and said negative terminal, a second output winding connected between said second anode and said positive terminal, a first input winding connected between said first control electrode and said negative terminal, and a second input winding connected between said second anode and said second control electrode.

11. A modulator, comprising, a first electronic tube having a cathode circuit, a second electronic tube having an anode circuit, a load circuit for said modulator comprising a transformer consisting of a first winding connected in said anode circuit, a second winding connected in said cathode circuit, and means for deriving signal output from said first and second windings, said first and second windings being unity coupled.

12. A modulator, comprising, a first electronic tube having a cathode circuit, a second electronic tube having an anode circuit, a load circuit for said modulator comprising a transformer consisting of a first winding connected in said anode circuit, a second winding connected in said cathode circuit, and means for deriving signal output from said first and second windings, said first and second windings being relatively bi-filarly wound.

13. A modulator, comprising, a first electronic tube having a first anode, cathode, control electrode and screen grid electrode, a source of anode voltage having a positive and a negative terminal, a first output winding connected between said first cathode and said negative terminal, a second output winding connected between said second anode and said positive terminal, a first input winding connected between said first control electrode and said negative terminal, a second input winding connected between said second anode and said second control electrode, means connecting said first screen grid electrode to said second anode, and means connecting said second screen grid electrode to said positive terminal.

14. A modulation system, comprising, a push-pull modulator having an output circuit, said output circuit comprising a pair of bi-filarly wound windings, a source of radio frequency oscillations to be modulated comprising an electronic tube having an anode responsive to control potential for determining the amplitude of said oscillations, and means for deriving said control potential comprising a D.-C. connection between one of said windings only and said anode.

15. A modulation system, comprising, a first modulator tube having a first anode, cathode and control electrode, a second modulator tube having a second anode cathode and control electrode, a source of anode voltage, a first output winding connected between said first cathode and said negative terminal, a second output winding connected between said second anode and said positive terminal, a third electronic tube for supplying radio frequency currents and having an electrode responsive to control potential for determining the amplitude of said oscillations, a modulating winding connected in series with said source of anode voltage and said last named electrode, and comprising a condenser for coupling one of said output windings to said modulating winding.

16. A modulation system, comprising, a push-pull modulator, said modulator comprising, a first modulator tube having a first anode, cathode and control electrode, a second modulator tube having a second anode, cathode and control electrode, a source of anode voltage having a positive and a negative terminal, a first output winding connected between said first cathode and said negative terminal, a second output winding connected between said second anode and said positive terminal, a third electronic tube for supplying radio frequency currents and having a third anode and cathode, a modulating winding connected in series between said third cathode and said negative terminal, and means connecting said third anode to said positive terminal.

17. A modulation system, comprising a push-pull modulator, said modulator comprising a first modulator tube having a first anode, cathode and control electrode, a second modulator tube having a second anode, cathode and control electrode, a source of anode voltage having a positive and a negative terminal, a first output winding connected between said first cathode and said negative terminal, a second output winding connected between said second anode and said positive terminal, a third electronic tube for supplying radio frequency currents and having a third anode and cathode, a modulating winding connected in series between said positive terminal and said third anode, means coupling said third anode to said second anode, and means connecting said third cathode to said negative terminal.

18. A modulation system, comprising, a push-pull modulator having an output circuit, said output circuit comprising a pair of bi-filarly wound windings, a source of radio frequency oscillations to be modulated, said source of radio frequency oscillations comprising an electronic tube having an electrode responsive to control potential for determining the amplitude of said oscillations and having a normal D.-C. potential in the absence of modulating signals, and means for applying to said electrode said D.-C. potential and said control potential, said last named means comprising a D.-C. connection between said electrode and a point of one of said bi-filarly wound windings.

19. In a wide band modulator operative from a source of anode voltage having a negative and a positive terminal, a first vacuum amplifier having a first anode, a first cathode and at least one first control electrode, a second vacuum amplifier having a second anode, a second cathode and at least one second control electrode, a first winding having first and second end terminals, and a second winding having third and fourth end terminals, said first and second windings substantially unity coupled, means for connecting said first terminal to said first cathode, said second terminal to said negative terminal, said third terminal to said second anode, said fourth terminal to said positive terminal, and means for applying signal to said first and second control electrodes in push-pull relation, and means for connecting said first anode to said positive terminal.

20. The combination in accordance with claim 1 in which said first and second windings are mutually bi-filarly wound.

21. In a wide band modulator operative from a source of anode voltage having a negative and a positive terminal, a first electronic tube amplifier having a first anode, a first cathode, and at least one first control electrode, a second electronic amplifier having a second anode, a second cathode and at least one second control electrode, a first winding having a first and a second end terminal, a second winding having a third and a fourth end terminal, means for maintaining said first and third terminals at substantially identical alternating voltage over said band, means for maintaining said second and fourth terminals at substantially identical alternating voltage over said band, means for connecting said first terminal to said first cathode, said third terminal to said second anode, said second terminal to said negative terminal, said fourth terminal to said positive terminal, and means for applying signal to said first and second control electrodes in push-pull relation.

22. In a wide band modulator operative from a source of anode voltage having a negative and a positive terminal, a first electronic amplifier tube having an anode and a cathode and a control electrode, a second electronic amplifier tube having an anode, a cathode and a control electrode, means for applying signal to said control electrodes in push-pull relation, a first winding connected in series between said positive terminal and the anode of said second electronic amplifier tube, a second winding connected in series between said negative terminal and said cathode of said first electronic tube, a low impedance condenser coupling said cathode of said first electronic amplifier tube to said anode of said second electronic amplifier tube, and means for connecting said positive terminal to said anode of said first electronic amplifying tube.

23. In a wide band modulator operative from a source of anode voltage, a first electronic amplifier tube having a first anode, a first cathode, and a first control electrode, a second electronic amplifier tube having a second anode, a second cathode and a second control electrode, a first winding interconnecting said first and second cathodes, a second winding interconnecting said first and second anodes, a condenser for intercoupling said first cathode with said second anode for maintaining substantially identical alternating voltage at said first cathode and second anode, means for connecting said anodes and cathodes to said source of anode voltage, and means for driving said control electrodes in push-pull relation.

24. The combination in accordance with claim 5 wherein said first and second windings are substantially unity coupled electro-magnetically.

25. The combination in accordance with claim 5 wherein said first and second windings are bi-filarly related.

26. The combination in accordance with claim 5 wherein is further provided in said first electronic amplifier tube a first screen grid and in said second electronic amplifier tube a second screen grid, means for connecting said first screen grid to said second anode and said second screen grid to said first anode.

27. The combination in accordance with claim 5 wherein said means for driving said control electrodes in push-pull relation comprises an input transformer having a first secondary winding connected between said first control electrode and said second cathode, and a second secondary winding coupled between said second anode and said second control electrode.

28. In a wide band modulator, the combination comprising a first amplifier tube having a first anode, a first cathode and a first control electrode, a second amplifier tube having a second anode, a second cathode, and a second control electrode, a first winding connected between said first and second cathodes, a second winding connected between said first and second anodes, means for maintaining substantially zero alternating current voltages between said first anode and said second cathode and between said second first cathode and said second anode, means for applying signal to said control electrodes in push-pull relation, and means for deriving output signal from said amplifier tubes.

FRANK H. McINTOSH.

REFERENCES CITED

The following references are of record in the file of this patent:

UNITED STATES PATENTS

| Number | Name | Date |
|---|---|---|
| 2,379,168 | McClellan | June 26, 1945 |

FOREIGN PATENTS

| Number | Country | Date |
|---|---|---|
| 111,668 | Australia | Sept. 30, 1940 |